May 16, 1967 S. A. BILLAWALA 3,320,599

MOUNTING AND ACTUATING APPARATUS FOR A MAGNETIC HEAD

Filed June 7, 1963 5 Sheets-Sheet 1

MOUNTING AND ACTUATING APPARATUS FOR A MAGNETIC HEAD

Filed June 7, 1963 5 Sheets-Sheet 2

INVENTOR.
SHAHBUDDIN A. BILLAWALA
BY
Christie, Parker & Hale
ATTORNEYS.

MOUNTING AND ACTUATING APPARATUS FOR A MAGNETIC HEAD

Filed June 7, 1963 5 Sheets-Sheet 3

INVENTOR.
SHAHBUDDIN A. BILLAWALA
BY
Christie, Parker & Hale
ATTORNEYS.

INVENTOR.
SHAHBUDDIN A. BILLAWALA
BY
Christie, Parker & Hale
ATTORNEYS.

May 16, 1967 S. A. BILLAWALA 3,320,599

MOUNTING AND ACTUATING APPARATUS FOR A MAGNETIC HEAD

Filed June 7, 1963 5 Sheets-Sheet 5

INVENTOR.
SHAHBUDDIN A. BILLAWALA
BY
Christie, Parker & Hale
ATTORNEYS.

3,320,599

MOUNTING AND ACTUATING APPARATUS FOR A MAGNETIC HEAD

Shahbuddin A. Billawala, Pasadena, Calif., assignor to Burroughs Corporation, Detroit, Mich., a corporation of Michigan Filed June 7, 1963, Ser. No. 286,374
9 Claims. (Cl. 340—174.1)

This invention relates to electromagnetic reading and writing heads and, more particularly, to electromagnetic reading and writing heads which float on a thin film of air adjacent a moving magnetic recording surface for reading and writing on the recording surface.

Magnetic recording heads of the type commonly used for reading and writing on magnetic recording surfaces are often used for recording digital information at extremely high densities. As the density at which digital information is recorded on a magnetic recording surface is increased, the gap between the magnetic recording head and the magnetic recording surface must be decreased. The smaller the gap and the closer the magnetic recording head is positioned adjacent the magnetic recording surface, the more difficult it becomes to control the mechanical tolerances of the structure mounting the recording head. To overcome these mechanical difficulties, mechanical recording head assemblies have been adapted for floating on a thin film of air caused by the moving magnetic recording surface.

Elaborate mechanical head support devices have been devised for guiding and supporting magnetic recording head assemblies while floating adjacent magnetic recording surfaces. Generally, the mechanical head support devices are arranged with mechanical adjusting devices positioned right at the head itself and an individual adjusting device is provided for each individual recording head.

Such an arrangement is undesirable particularly when magnetic recording head assemblies are floated extremely close to the magnetic recording surface. One reason is that while adjusting the magnetic head support device, it is quite possible to accidentally force the head against the recording surface causing injury both to the head and to the recording surface. Another reason is that it is generally not possible or extremely difficult to adjust the heads while they are floating adjacent a moving magnetic recording surface. Adjustment of the heads while floating is quite desirable in order to accurately position the head. Thus, if a large number of head assemblies are provided in a file and it is desired to adjust the gap between the head assemblies and the recording surface of a number of heads, it is necessary to adjust each individual head assembly separately.

In a storage system having magnetic recording disks, the force necessary for floating a head at a preselected distance from the moving recording disk varies depending on the radial distance from the axis of the disk that the recording head assembly is floated. Generally, different mounting devices are designed for supporting the head assemblies depending on the radial position at which the head assemblies are placed. To this end, different head mounting devices having different springs with different stiffness characteristics are used depending on the amount of force necessary for the particular head assembly. Such an arrangement is undesirable during an assembling operation since it is quite possible for an assembler to place the wrong head mounting apparatus at the wrong radial position on the recording disk.

In contrast, the present invention is directed to mounting and actuating devices for a floating magnetic head assembly in which all head assemblies at the same radial position in a disk storage system may be adjusted simultaneously. Also, the head to magnetic surface gaps may be adjusted remotely and while the magnetic head is floating on the moving magnetic surface. Additionally, the chance of damaging the recording surface or the heads is greatly reduced since the adjustment of the heads are made remotely and away from the head assemblies and magnetic surface. Additionally, only a single head mounting device is required.

An embodiment of the present invention comprises a plurality of rotating magnetic surfaces moving in a fluid atmosphere and forming a fluid bearing adjacent thereto. A plurality of magnetic head assemblies are supported at different radial positions adjacent each magnetic surface and are adapted for floating on the fluid bearing. Each head assembly adjacent one surface is at the same radius as a head adjacent the other surfaces. A controllable fluid actuating means is provided for each of the head assemblies for applying a force thereto for moving same into a floating position on the fluid bearing. Also included is a source of fluid pressure and an adjustable regulating device for each different radial position of said head assemblies for coupling the source to the fluid actuating means for the heads at the corresponding radius for controlling the force applied thereby to the head assemblies and thereby simultaneously control the head to magnetic surface gaps of all heads at the same radial position.

A feature of the invention lies in the fluid actuating means wherein a fluid chamber is provided with two fluid actuating plungers extending out of the chamber in opposite directions for moving two head assemblies into a floating position with respect to two facing magnetic surfaces at the same time.

These and other aspects of the present invention may be more fully understood with reference to the following description with reference to the drawings, of which:

FIG. 3 shows a plan view of a recording disk together with a portion of a head mounting casting shown, with a portion of the disk broken away to show the head assemblies, the head support devices and the head actuating devices, the head actuating devices being indicated generally by outlines in order to illustrate the relative positions thereof with respect to the center of the disk;

Figure 11:
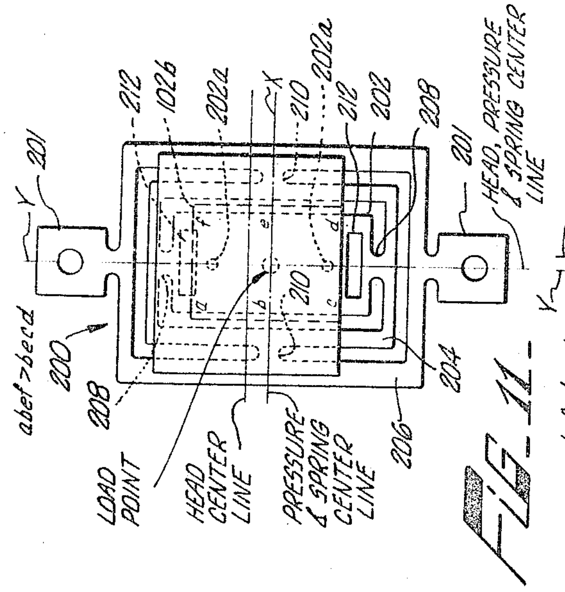
Figure 12:
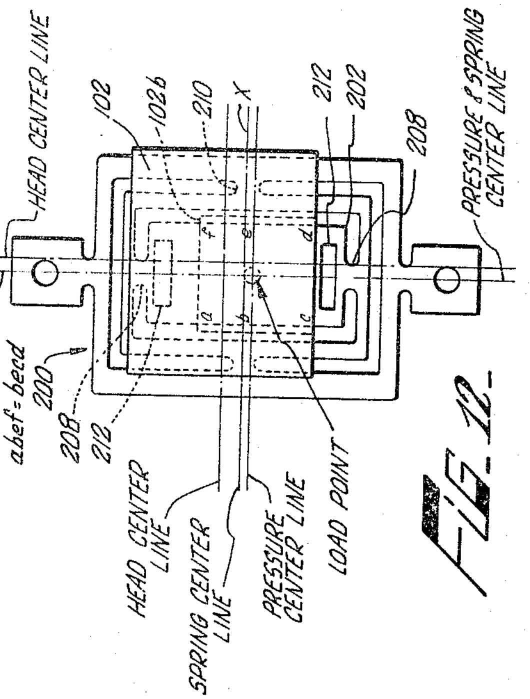

FIG. 11 is a plan view of a magnetic recording head mounted on a head support device illustrating one form of the invention used to obtain a positive angle of approach for the head when moving into a floating position adjacent a moving magnetic recording disk; and FIG. 12 is a plan view of a magnetic recording head assembly mounted on a head support device illustrating an alternate form of the invention used to obtain a positive angle of approach for the head when moving into a floating position adjacent a moving magnetic recording disk.

Figure 1:
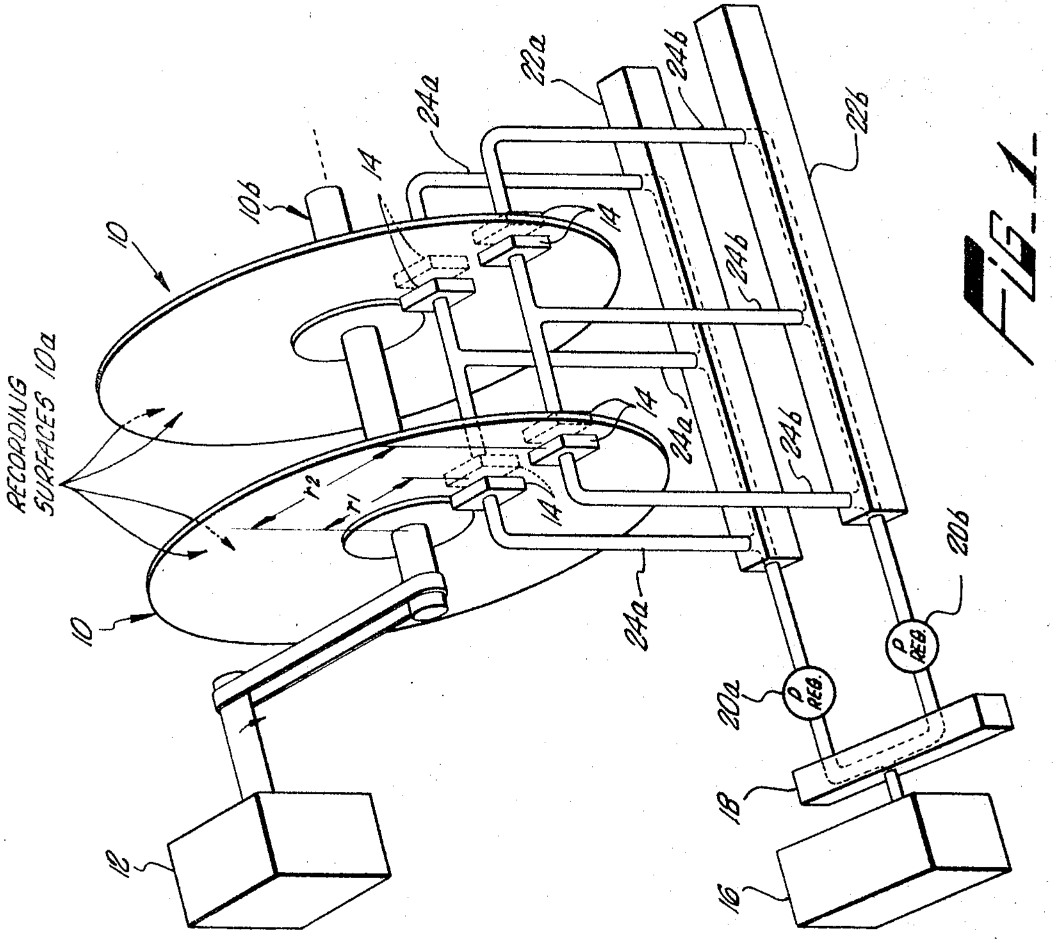
FIG. 1 is a schematic sketch of a magnetic recording disk file illustrating the general form of one embodiment of the present invention.
Figure 2:
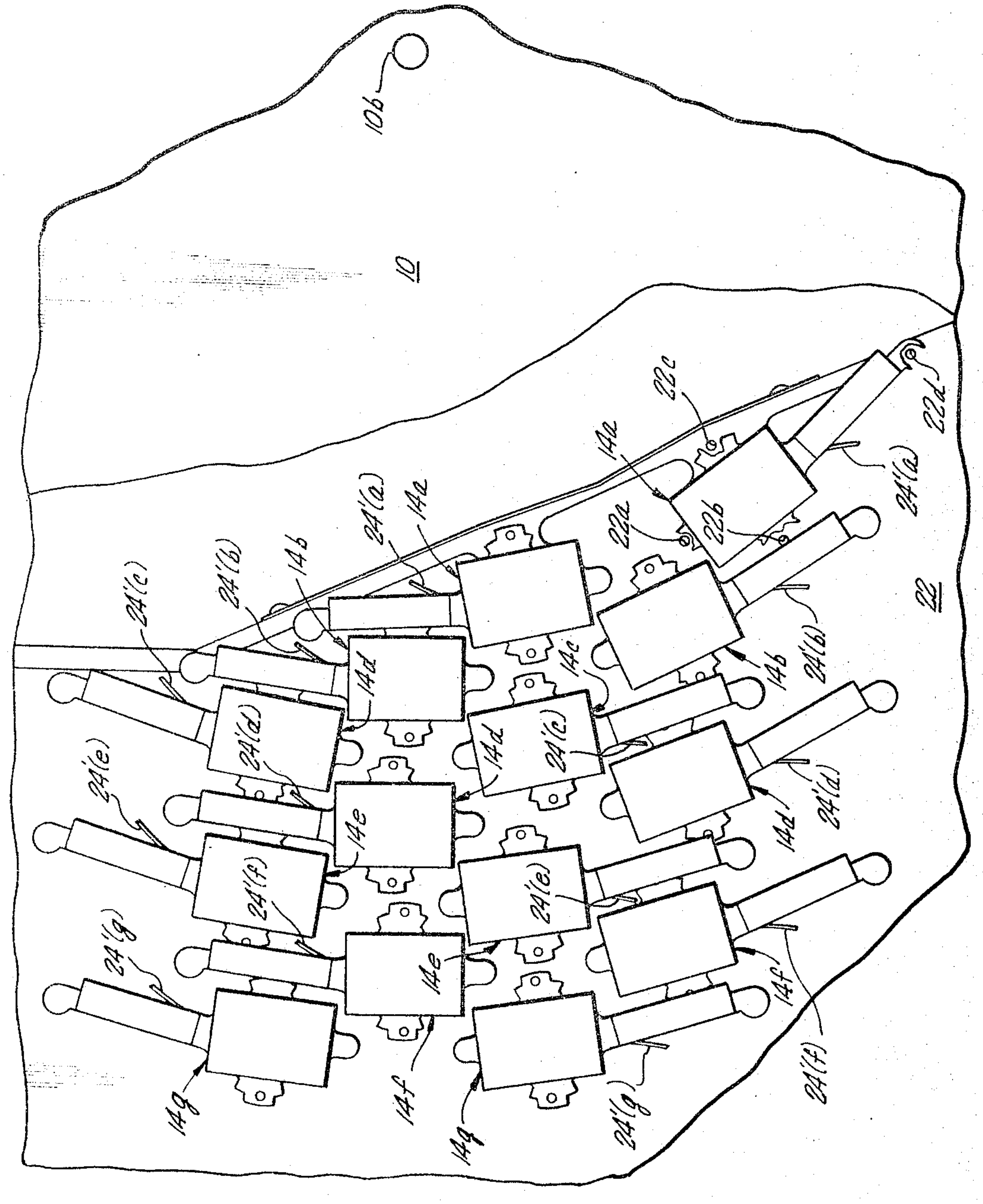

Refer now to the sketch of the magnetic recording disk file embodying the invention shown in FIG. 1. The disk file of FIG. 1 includes two magnetic recording disks 10 each of which has a magnetic recording surface 10*a* on each side of the disk. The magnetic recording surfaces 10*a* are formed of magnetic recording material similar to that commonly used on magnetic recording drums and disks for digital computers and the like. The magnetic recording disks 10 are mounted to a common axle 10*b* which is rotated by a motor 12. Also provided are a plurality of magnetic recording heads including a substantially flat surface (not shown) adapted for floating on an air bearing caused by the rotating magnetic recording surfaces 10*a*. Associated with each magnetic recording head are a head support device and a head actuating device. The magnetic recording head, the head support device and head actuating device are shown generally at 14 in FIG. 1. Each of the recording surfaces 10*a* are shown with two assemblies 14 positioned at different positions adjacent thereto. Each of the assemblies 14 on a recording surface 10*a* has a corresponding assembly 14 at the same radial position on each of the recording surfaces 10*a*.

The head assembly in each of the assemblies 14 are composed of a plurality of individual magnetic recording heads similar to those used for reading and writing on magnetic drums in digital computers. Each of the head assemblies in the assemblies 14 define a circular magnetic recording track on the corresponding recording surface 10*a* as the disks 10 rotate. Thus, each of the tracks on each disk surface is arranged at the same radial position as a track on each of the other disk surfaces 10*a*.

To be explained in detail, the head support device in the assembly 14 is connected to the head assembly thereof so that the corresponding head actuating device may actuate the head assembly into a floating position adjacent the corresponding recording surface 10*a*. The head actuating devices are controllable and are in fact controlled by air pressure from a source of air pressure 16. The source of air pressure 16 is connected through a manifold 18 to the input of two pressure regulators 20*a* and 20*b*. The air pressure regulator 20*a* has its output port connected to the input port of a manifold 22*a*. The manifold 22*a* has output ports connected to air lines 24*a* which couple the pressure in the manifold 22*a* to all of the head actuating devices in the assemblies 14 at a radius $r1$ on the disks 10.

Similarly, the output port of the air pressure regulator 20*b* has its output port connected to the input port of the manifold 20*b* which in turn has its output ports connected to air lines 24*b* which couple the pressure in the manifold 22*b* to all of the head actuating devices in the assemblies 14 which are positioned at a radius $r2$ of the disks 10.

The air pressure regulators 20*a* and 20*b* are arranged for providing a constant pressure at the output ports thereof determined by the pressure setting thereof. The head actuating device in each of the assemblies 14 are controlled by air pressure, and the pressure applied to the input of the head actuating device in each of the assemblies 14 determines the amount of force applied by the head actuating device to the corresponding head assembly and thereby determines the gap between the head and recording surface 10*a*. Thus, it should now be evident that the output pressure of the regulator 20*a* may be adjusted and thereby simultaneously adjust the head to recording surface gap of the heads in each of the assemblies 14 along the radius $r1$. Similarly, the output pressure of the regulator 20*b* may be adjusted and thereby simultaneously adjust the head to recording surface gap of each of the head assemblies in the devices 14 along the radius $r2$.

Figure 2:
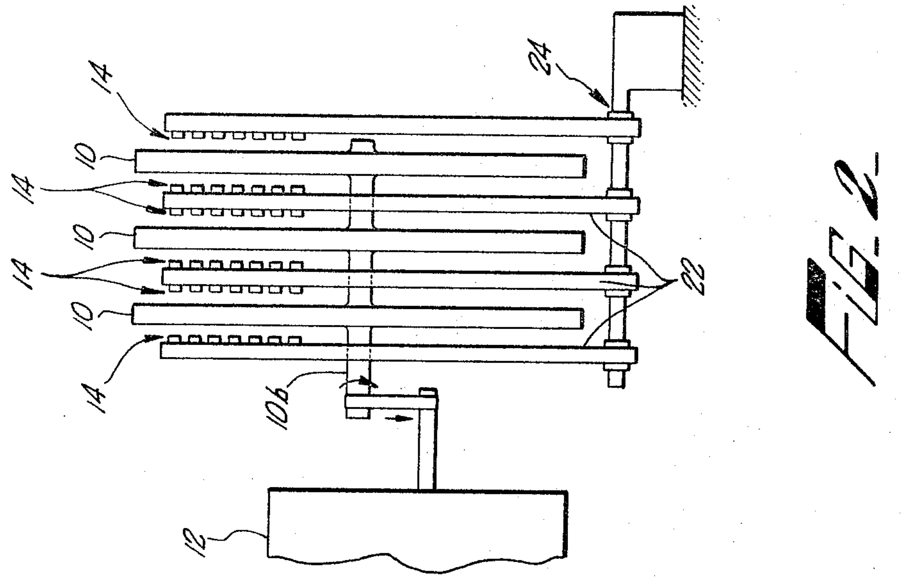
FIG. 2 is a schematic sketch illustrating a side elevation view of the mechanical structure of a magnetic recording disk file which embodies the present invention.

Refer now to FIG. 2 which is a sketch illustrating a side elevation view of the mechanical structure of a magnetic recording disk file which embodies the present invention. FIG. 2 shows three magnetic recording disks 10 and four head mounting castings 22. Two head mounting castings are positioned on the outer side of the two outer recording disks 10 and two head mounting castings are positioned in between the middle and the two outer disks 10. The disks 10 are connected to an axle 10*b* as explained with reference to FIG. 1. A motor 12 is again shown in FIG. 2 and is coupled to the axle 10*b* for rotating the magnetic recording disks 10.

The head mounting castings 22 are rotatably mounted to a bearing 24 and are adapted for rotation outwardly from the plane of FIG. 2 on the bearing 24 to allow easy access to the assemblies 14 mounted thereon. The assemblies 14 are mounted on the head mounting castings 22 so that when the head mounting castings 22 are rotated up adjacent the disks 10 as shown in FIG. 2, the head assemblies are adjacent the recording surfaces 10*a* of the disk 10.

Refer now to FIG. 3. FIG. 3 shows a plan view of a recording disk together with a portion of an adjacent head mounting casting shown with a portion of the disk broken away to show the arrangement of the head assemblies, the head support devices and the head actuating device on the casting 22. As explained hereinabove, the head assemblies, the head support devices and the actuating devices are referenced generally by the symbol 14.

The assemblies 14 are illustrated by a general outline thereof which does not show all of the details of the assemblies 14. The assemblies 14 are illustrated essentially at seven different radii from the axle 10*b* of the disk 10. Two assemblies 14 are positioned essentially at each of the seven radii. The two assemblies positioned at each of the seven radii are referenced by the same letters; i.e., 14(*a*), 14(*b*) . . . 14(*g*). It should also be noted that the view of the casting 22 shown in FIG. 3 is such that the pivot point of the casting 22 is at some point off of the lower portion of the drawing of FIG. 3 and, therefore, not shown.

The input air lines of the assemblies 14 are referenced in FIG. 3 by the reference number 24' followed by a letter corresponding to the letter designation of the corresponding assemblies 14 (i.e., 24'(*a*) through 24'(*g*)). With the configuration of FIG. 3, all of the air lines having like reference letters associated therewith will be connected through a common manifold to a single regulator as illustrated in connection with FIG. 1.

Figures 4, 6, 7:
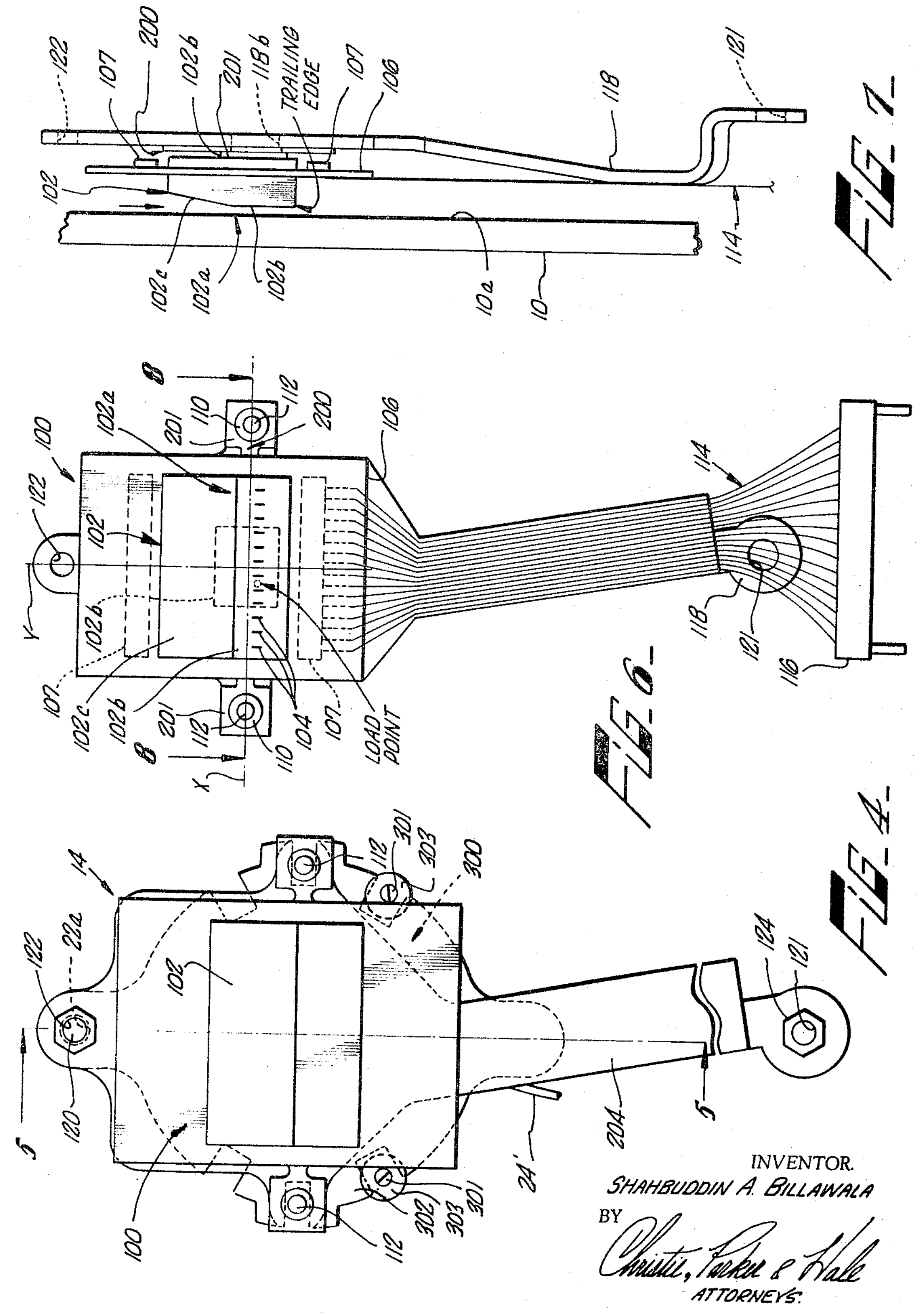
FIG. 4 is an enlarged top elevation view of one of the assemblies including a head assembly, along with a corresponding head support device and a head actuating device which are shown in outline in FIG. 3 (the details of the surrounding casting are not shown)
FIG. 6 is a plan view of one of the magnetic head assemblies together with the corresponding head support device and the corresponding support structure shown in FIGS. 4 and 5.
FIG. 7 is a side elevation view of the assembly shown in FIG. 6 along with a portion of a rotating magnetic recording disk added adjacent the head assembly and shown with the rivets and washers for securing the head support device and the electrical connector removed.
Figure 5:
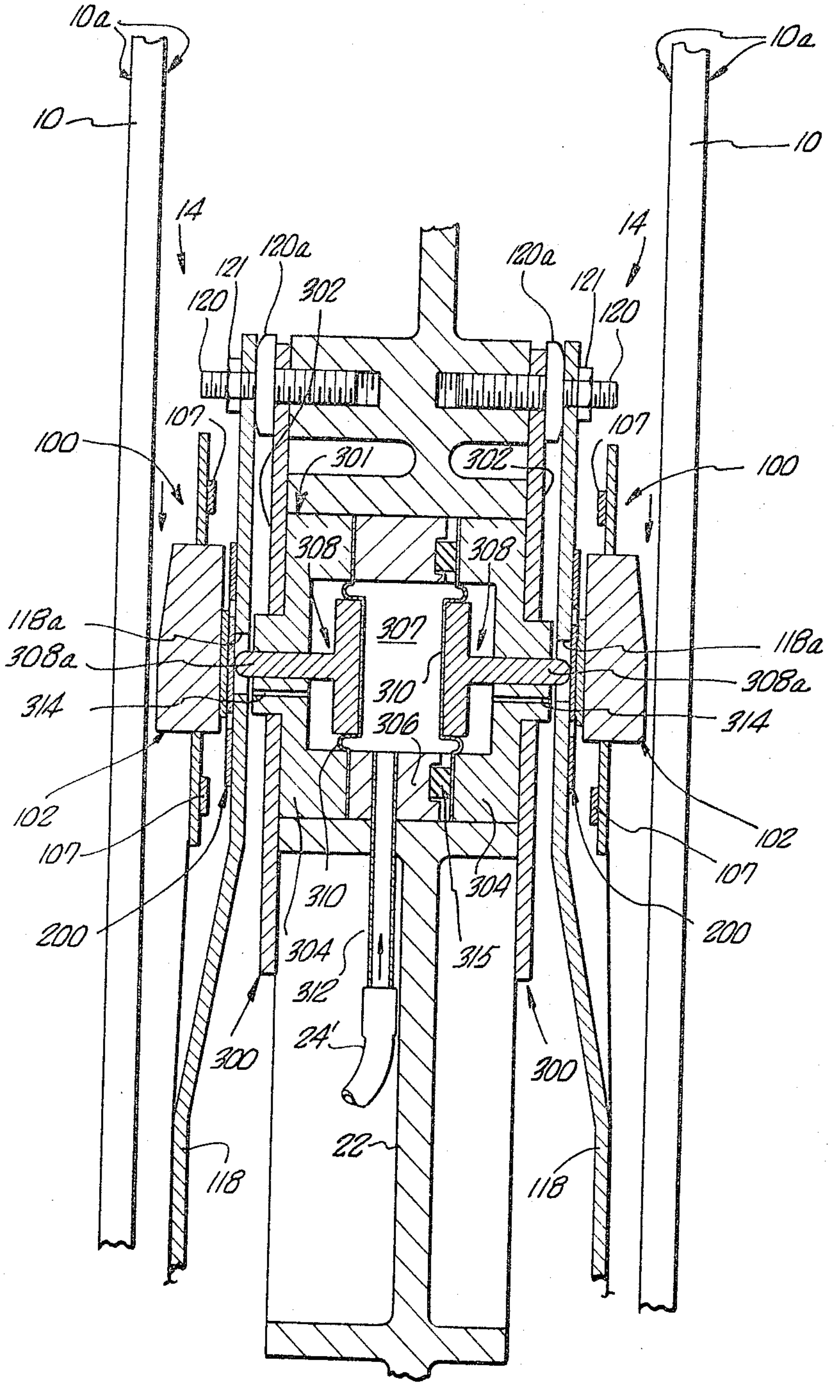
FIG. 5 is a section view of one of the magnetic head assemblies along with the associated mounting and actuating apparatus therefor taken along the line 5—5 of FIG. 4 showing part of the surrounding casting.

Refer now to FIGS. 4 and 5. FIG. 4 is an enlarged top elevation view of one of the assemblies 14 along with a corresponding head support device and a head actuating device which are shown in outline in FIG. 3. The details of the surrounding casting are not shown. FIG. 5 is a section view of the assembly shown in FIG. 4 taken along the line 5—5 and shows details of the surrounding casting.

Each of the assemblies 14 include a head assembly, associated electronics, a head support device and a support structure, all of which are shown generally at 100. Also included in the assembly 14 is a head actuating device shown generally at 300.

Figure 8:
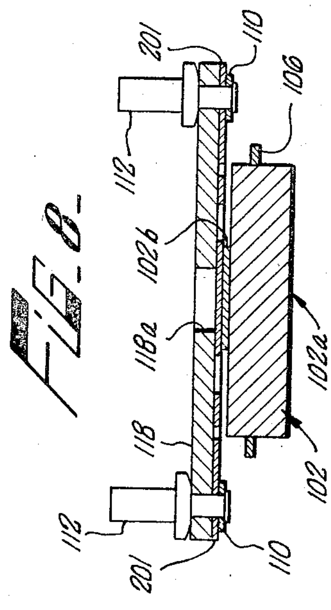
FIG. 8 is a section view of the apparatus of FIG. 6 taken along the line 8—8 with the electrical connector removed.

Before considering the details of the head actuating device 300, refer to FIGS. 6, 7 and 8 which show the details of the assembly shown generally at 100. The magnetic recording head assembly is shown generally at 102. The magnetic recording head assembly 102 is mounted by means of a mounting block **102*b* to the head support device shown generally at 200. The magnetic recording head assembly 102 has a plurality of small magnetic recording heads 104 similar to those commonly used for reading and writing on magnetic recording drums and disks in digital computers. The magnetic recording head assembly 102 has a block 102*b* at the bottom thereof which may be glued or attached by other well known means to the head support device 200**.

Also included in the assembly 100 are electronics for switching the output circuits of the magnetic recording heads 104 which include a printed circuit board 106 and switching circuits 107. The switching circuits 107 may include switching devices such as silicon rectifier diodes, etc. The printed circuit board 106 includes an aperture in which the magnetic recording head assembly 102 is inserted. The printed circuit board 106 is securely connected to the recording head assembly 102 by means not shown in FIGS. 6, 7 and 8.

The rotating magnetic recording disk 10 rotates at a sufficiently high velocity to form an air bearing **10*a* adjacent the magnetic recording surface 10*a*, upon which the magnetic recording head assembly 102** floats while reading and writing.

Thus, the magnetic recording means or disk 10 including the recording surface **10*a* rotates in air which may be referred to as a fluid atmosphere and forms an air bearing which may be referred to as a fluid bearing, adjacent the recording surface 10*a***.

The magnetic recording head assembly 102 has a bearing surface **102*a* which rests upon the air bearing 10*a* when the head assembly 102 is actuated into a floating position. The bearing surface 102*a* includes a beveled surface formed so as to provide increased pressure normal to the surface 102*a* near the leading edge thereof and thereby provide improved floating characteristics for the head assembly 102 over that if a completely flat bearing surface were used. The bevel also provides more stability while moving the head assembly into a floating position. The bevel is exaggerated in FIG. 7 and shown generally at 102*c***.

The bearing surface **102*a* also includes the previously mentioned substantially flat bearing surface which is shown generally at 102*b*. The flat bearing surface 102*b* is rotated substantially parallel with the recording surface 10*a* when the head assembly 102*a* is actuated into a floating position adjacent the disk 10**.

The output circuits of the electronic circuits 107 on the circuit board 106 are connected by means of electrical conductors 114 to an electrical connector 116.

The support structure of the assembly 100 is shown generally at 118. The head support device 200 is connected to the support structure 118 by means of a pair of rivets 112 and a pair of washers 110. The rivets 112 serve two purposes. As already mentioned, the rivets 112 serve to attach the head support device 200 to the support structure 118. In addition, the rivets 112 are elongated so that they may be slip-fitted into apertures **22*b* and 22*c* in the casting 22 (see FIG. 3). The rivets 112 accurately position the support structure and the head assembly 102 connected thereto with respect to the head actuating device 300**. The positioning will be dealt with in detail in connection with FIGS. 10 through 12.

The support structure 118 also includes two apertures 121 and 122. With reference to FIGS. 4 and 5, it will be noted that a bolt 120 is extended through the aperture 122 and is threaded into an aperture **22*a* in the casting 22 (see also FIG. 3). Similarly, a bolt 124 (not shown in FIG. 3) is passed through the aperture 121 and threaded into an aperture 22*d* in the casting 22 also for connecting the support structure 118 to the casting 22. The apertures 22*a* through 22*d* are shown in FIG. 3 where portions of the support structure 118 of assembly 14*a*** are broken away in order to expose the apertures.

The bolt 120 is a special bolt having an enlarged portion **120*a* which holds a plate 302 rigidly against the casting 22 and thereby holds an outer ring 304 of the head actuating device 300 in place. The bolt 120 also has a threaded portion extending out from the casting 22 on which a nut 121 is threaded. The nut 121 actually holds the support structure 118** in place.

Referring again to FIG. 7, an aperture **118*a* is provided in the support structure 118 to allow a plunger in the head actuating device 300 to pass therethrough and engage the bottom surface of the head support device 200**.

Figure 9:
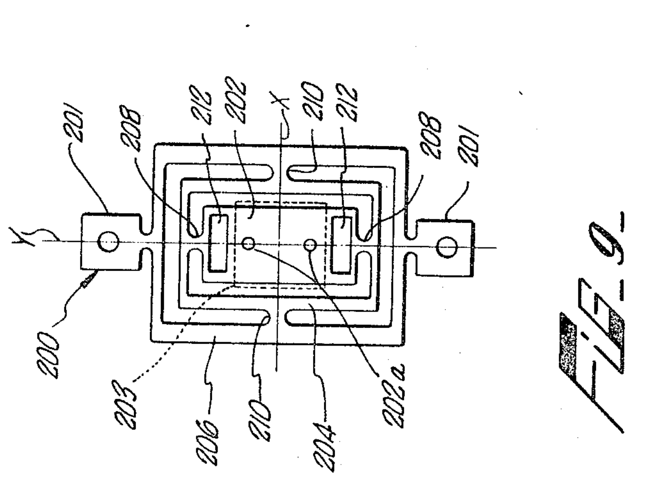
FIG. 9 is a plan view of the head support device shown in FIGS. 4 through 8.

Refer now to the plan view of the head support device 200 referred to in regard to FIGS. 1 through 8 and which is shown in FIG. 9. The head support device 200 is a substantially flat body structure or plate. The head support device 200 is composed of an elastic material such as heat treated beryllium copper which will deform under an applied force but which normally returns to a substantially flat condition when such force is removed. The head support device 200 also includes two ears 201 which include apertures to allow the head support device 200 to be attached to the mounting structure 118 by means of the rivets 112 and washers 110 as shown in FIGS. 4 through 8. The body structure of the head support device 200 also includes a plurality of perforations arranged so as to define a rectangular head support member 202, an inner rectangular support member 204 and an outer rectangular support member 206. The head support member 202 includes apertures **202*a* through which rivets or screws may be extended into the base structure 102*b* of the head assembly 102 connected thereto as an alternative to gluing the base structure 102*b* of the head assembly 10 to the head support device 200. The head support member 202 is connected by means of a pair of connecting members 208 to the inner rectangular support member 204. The connecting members 208 are connected at opposite points along the edges of the head support member 202. The rectangular inner support member is connected by means of a pair of connecting members 210 to the outer rectangular support member 206. The connecting members 210 are connected at opposite points along the edges of the inner support member 204**.

Two perpendicular dashed center lines are shown in FIG. 9 to represent an X and a Y axis of the head support device 200. The connecting members 208 and 210, the inner and outer support members 204 and 206 inhibit any movement of the head support member 202 as well as any movement of the head assembly 102 connected thereto parallel with the surface of the magnetic recording surface **10*a*. However, if a rotational force is applied to the head support surface 202 or the head assembly 102 connected thereto about either the Y or the X axis, the inner and outer support members 204 and 206 and the connecting members 208 and 210 deform and thereby allow such rotational movement of the head support member 202 and the connected head assembly. However, since the head support device 200 is actually a spring formed of an elastic material, rotational movement is restrained and as the rotational force is removed, the head support device 200 automatically returns the head support member 202 and the connected head assembly 102** to its normal position.

Thus, the head support device 200 provides gimbaled action defined herein as being rotational movement of the head support member 202 or connected head assembly 102 about a pivot point. Normally, the gimbaled action is about the pivot point formed by a plunger of the head actuating device 300 as will be explained hereinafter.

Figure 10:
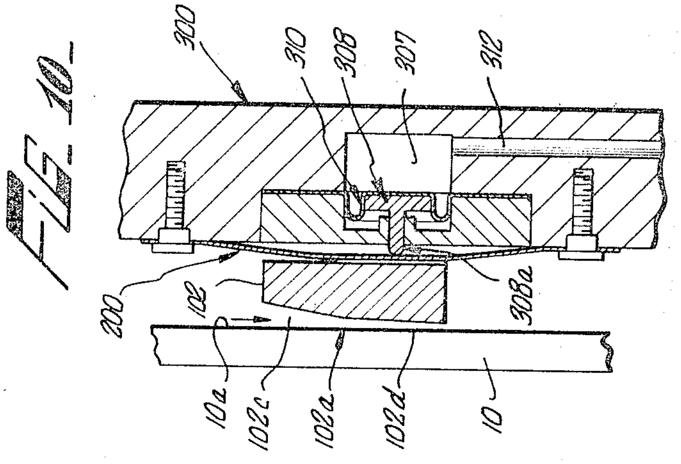
FIG. 10 is a cross-sectional view of a head actuation device actuating a magnetic recording head assembly, which is fastened to a head support device, into a floating position adjacent a magnetic recording disk; the apparatus of FIG. 10 being shown in order to illustrate the operation of one form of the invention.

A force normal to the plane of the head support device 200 such as that illustrated in FIG. 10 causes the members )4, 206, 208 and 210 to deform and allow restrained ovement of the head support movement 202 and the onnected head assembly 102 normal to the plane of the :cording surface 10*a*. It should also be noted that such iovement is perpendicular to the plane of the head sup- ort device 200 along a line perpendicular to the X and ' axes.

One of the more important aspects of the head support evice for a magnetic head assembly constructed in ac- ordance with the present invention, such as head support evice 200, is its ability to accurately guide a head assem- ly into a floating position. This aspect of the present ivention will be more fully described after the details f the head actuating device 300 are explained.

The head support device 200 also has two rectangular erforations 212 formed in the head support members 02, one at either end adjacent the connecting members 08. With a magnetic recording head connected to the ead support device 200 as shown in FIGS. 4 through 8, : has been found the additional deflection allowed by he perforations 212 improve the operation of the head upport device 200. The thin strip of material between he perforations 212 and the outer edges of the head upport member 202 provide the additional deflection ınder rotational and actuation forces on the head support levice 200.

It should be noted that the base structure 102*b* of the ıead assembly 102 shown in FIGS. 4 through 8 is small ;nough that it does not extend over the perforations 212 or the inner support member 204. A dotted line 203 in FIG. 4 illustrates the general outline of the base structure 102*b* when fastened to the head support member 202.

It should be noted that a head support device may be constructed within the scope of the present invention as claimed, in which some or all of the support members are made of a non-elastic material. For example, the connecting members such as 208 and 210 can be formed of an elastic material to allow gimbaled action, whereas the support members 204 and 206 and the head support member 202 could be formed of a nonelastic material. Additionally, wtihin the scope of the invention as claimed, the outer rotational support member 206 could be eliminated and the pair of elastic connecting members 210 connected directly to a connecting device such as the ears 201.

In connection with the head support device 200, it should be noted that head assemblies have been floated on an air bearing formed by a rotating magnetic floating disk with a disk to head gap of less than 100 microinches using a head support device as shown in FIG. 9. Other details of the head support device 200 are shown and claimed in a copending patent application entitled "Magnetic Head Mount Apparatus" filed in the name of Groom et al. on May 20, 1963, and bearing Ser. No 281,-504.

Refer now specifically to the head actuating device 300 shown in FIGS. 4 and 5. The head actuating device 300 includes a circular opening 301 extending through the head support casting 22. The opening 301 receives parts of two different head actuating devices 300 for use with two adjacent disks. One of the head actuating devices 300 includes an outer ring 304 and an inner ring 306 positioned as shown in FIG. 5. The outer ring 304 has an aperture which allows the plunger 308*a* of a piston 308 to extend therethrough and engage the bottom surface of the head support device 200. A circular diaphragm 310 is supported between the inner and outer rings 304 and 306. The bottom end of the piston 308 fits into a small recess pressed into the diaphragm 310.

The diaphragm 310 is formed of a rubber coated fabric material which isolates the atmosphere at the middle portion of the chamber 307 from the portion into which the piston 308 extends.

An input port 312 is provided to the chamber 307 including a tubular fitting. The tubular fitting extends through the head support casting 22 and the inner ring 306 into the chamber 307.

The head actuating devices 300 at both sides of the head support casting 22 are identical except that the one shown at the right hand side of FIG. 5 has a spacer ring 315. The head actuating device 300 shown at the right hand side of FIG. 5 also includes a portion of the inner ring 306. The spacer ring 315 is formed of a deformable material which allows an air tight fitting to be formed between the inner ring 306 and the diaphragm 310 shown at the right hand side of FIG. 5. An air pressure line 24' is connected to the tube 312. Air pressure is applied to the input port 312 which causes pressure to build up in the chamber 307. The plates 302 are placed on each side of the casting 22 for holding the inner ring 306 and the outer rings 304 in the opening 301. In addition to the bolt 120, screws 301 and washers 303 (see FIG. 4) are used to secure the plate 302 to the casting 22.

Consider now the operation of the head actuating devices 300 shown in FIG. 5. As pressure in the chamber 307 builds up in between the two diaphragms 310, both diaphragms are forced outwardly causing the pistons 308 to move outwardly and force the plunger 308*a* of each piston 308 against the bottom surface of the corresponding head support device 200. When the pressure in the chamber 307 builds up to the proper level, the plunger 308 starts forcing the head support member 202 of the head support device 200 outwardly, causing the head assembly 102 to be forced out into a floating position on the air bearing formed by the associated rotating magnetic recording disk 10. When the air pressure applied to the input port of the chamber 307 is decreased, the pistons 308 tend to retract to their normally deactuated position as shown in FIG. 5 due to the spring pressure of the head support device 200.

A port 314 is provided in the outer rings 304 in between the outer atmosphere and the outer ends of the chamber 307 to allow the pistons 308 to retract rapidly. The ports 314 are provided to prevent a vacuum from building up in between the diaphragms 310 and the outer rings 304 as the pistons 308 retract.

Consider now the point at which the plunger 308*a* engages the head support device 200 to force the corresponding head assembly 102 into a floating position. Referring in particular to FIG. 6, it will be noted that the load point or the point at which the plunger 308*a* engages the head support device 200 is displaced from the center of the head support device 200, the center of the head support device being depicted at the intersection of the X and Y coordinate axes (see FIG. 9 by way of example).

The displacement parallel with the Y axis is provided so that the substantially flat surface 102*d* of the head assembly 102 is forced out to the corresponding disk surface with a positive angle with respect to the disk surface. Referring to FIG. 10, it will be noted that the flat surface 102*d* of the head assembly 102 forms a small acute angle with respect to the recording disk surface 10*a*. Although the actuating mechanism for the head assembly in FIG. 10 is slightly different from that shown in FIG. 5, the angle of approach for the head assembly is quite similar for both actuating devices. Referring again to FIG. 5 as the head assembly 102 is first being forced out towards the recording surface 10*a*, the flat surface 102*d* is at a very slight acute angle facing the movement of the disk as indicated in FIG. 10. However, as pressure builds up over the bearing surface 102*a* of the head assembly 102 and the head assembly 102 starts floating on the air bearing adjacent the recording surface 10*a*, the head and the flat bearing surface 102*d* rotate on the air bearing towards a position with the flat bearing surface 102*d* substantially parallel with the recording surface 10*a*. When the force on the head due to the air bearing and plunger 308 are sufficiently large, the head is rotated into an operating position with the flat surface 102*d* substantially parallel with the recording surface.

The positive angle of approach of the head assembly 102 is quite important hydrodynamically for floating the head assembly 102. One important reason for the positive angle of approach is that it helps cause the head assembly 102 to be guided into a floating position smoothly. This is accomplished as it helps prevent the leading edge of the head from dipping down. Thus, dipping down of the leading edge of the head and striking of the disk surface during the operation of moving the head into a floating position is eliminated. In a preferred embodiment of the invention, the load point is selected so that the positive angle of approach starts out at about five to ten degrees.

The use of an air actuation system such as that shown in FIG. 5 has been found to be of considerable importance in floating magnetic recording heads with respect to a rotating disk. It is extremely difficult to obtain a disk which does not have any wobble or variation in surface flatness. Thus, as the disk rotates, the head to recording surface gap could change due to wobble in the disk if the head assembly were improperly mounted. However, the air actuation system of FIG. 5 allows the head assembly 102 to move with the variation in surface flatness or wobble of the disk without increasing the load on the head assembly. This is not true of a spring loaded head assembly constructed in accordance with the prior art.

It has also been found that the stiffness of the air in the chamber 307 and the damping characteristics of the air therein have ideal characteristics which allow the head assembly 102 to move in and out and yet avoid any oscillations in movement of the head assembly. It is quite important to also note that very high pressures are exerted by the air bearing and plunger 308 on the head assembly. Due to the stiffness characteristics of air, it is a much more desirable means for forcing the head assembly than a mechanical spring.

It should also be noted that if one of the disks 10 is further from the corresponding head assembly 102 than the disk at the other side of the casting 22 while the head assemblies are in a deactuated condition, the characteristics of the actuating device at each side are the same even though the plunger at one side of the chamber 307 must travel further than the plunger at the other side. After pressure has built up in the chamber 307 and the plungers are forced outward with the corresponding head assemblies 102 floating with respect to the associated recording disks, the characteristics of the air pressure in the chamber on the plungers are identical even though one plunger is displaced more than the other plunger. Thus, accurate gaps between the head assemblies and associate recording surfaces are obtained.

Referring again to FIG. 6, it will be noted that the load point is also displaced parallel with the X axis from the center of the head support device 200. A rotating magnetic recording disk has a different surface velocity depending on the radial position from the center of the disk. Also, the pressure of the air film adjacent the rotating disk increases as the surface velocity of the disk increases. Therefore, a point close to the center of a disk will have a smaller air film pressure than a point on the disk out towards the outer edge thereof. Similarly, the pressure applied by the air film to the bearing surface **102*a* of the head assembly 102 increases across the face thereof moving from the point closest to the center of the disk to the point closest to the outer edge of the disk. To this end, the load point is offset along the X axis as shown in FIG. 6 so that the pressure applied at the load point will compensate for the difference in pressure and cause the head assembly 102 to be forced with the flat bearing surface 102*d* substantially parallel with the recording surface 10*a*. This is accomplished because the force applied to the head assembly by the plunger is offset from the center of the head in the direction of the greater air bearing pressure on the bearing surface 102*a* so that the force due to the air bearing and plunger balance out and the bearing surface 102*a*** floats parallel with the disk surface.

Refer now to FIG. 10. FIG. 10 is an alternate embodiment of the invention showing the assembly 100 and the head actuating device 300. The head support device 200 and head assembly are shown in the process of being actuated by the plunger 308 into a floating position. During actuation but prior to its final floating position, the flat surface **102*d* of the head assembly 100 is at a slight acute angle with respect to the surface 10*a* of the disk 10. After the head assembly is fully actuated in its final position, it rests with the flat surface 102*d* parallel with the disk surface. Similar elements of the apparatus of FIG. 10 to those shown in FIGS. 4 and 5 are referenced by the same reference numbers. It will be noted that the head support device 200** is rotated 90 degrees with respect to the head support device shown in FIGS. 4 through 8. However, the operation of the apparatus of FIG. 10 is essentially the same as that of FIGS. 4 through 8.

Refer now to FIG. 11. It will be recalled a positive angle of approach of the head assembly 102 was obtained in the apparatus of FIGS. 4 through 8 by displacing the point of contact of the plunger **308*a* along the Y axis as indicated in FIG. 6. However, the positive angle of approach may be obtained in an alternate manner as shown in FIG. 10. In FIG. 10 the base structure 102*b* (indicated by dashed lines) is positioned off center of the head support device 200**. As indicated, the area *afbe* at one side of the X axis of the head support device 200 is larger than the area *becd* shown at the other side of the head support device 200. By offsetting the base structure **102*b* on the head support member 202 in this manner, more of the head support member 202** is free to deform than at the other side.

More specifically, the base structure **102*b* is securely cemented to the head support member 202 thereby causing the portion of the head support member 202 which is cemented to the base structure 102*b* to be rigid and inflexible. However, the portions of the head support member 202 which extend out from the base structure 102*b* are free to deform under pressure applied to the head assembly 102. Since more of the head support member 202 extends out from the base structure 102*b* at the lower portion of FIG. 11 than at the upper portion of FIG. 11, greater restraining forces will be exerted by the head support device 200 at the portion of the head at the upper side of FIG. 11 thereby causing it to be held further back from the recording surface as pressure is applied at the load point of the head support device 10**. Thus, a positive angle of approach as indicated in FIG. 10 will be obtained.

Refer now to FIG. 12. FIG. 12 is similar to FIG. 11 except that the area of contact of the head support structure **102*b* to the head support member 202** is symmetrical about the X and Y axes. That is, the area *afbe* is equal to the area *becd*. Similar to FIGS. 4 through 8, the load point is offset from the center of the head support structure parallel with the Y axis. This provides the positive angle of approach of the head assembly while being moved into a floating position.

The head assembly 102 is also displaced slightly to the right along the X axis. This arrangement is provided in order to compensate for the difference in pressure on the head assembly 102 due to the difference in air pressure moving radially out along the disk. In this manner, the plunger will cause more force to be applied at the right hand side of head assembly 102 than at the left hand side of head assembly 102 as shown in FIG. 12.

Having considered the possible positions at which load may be applied to the head support device 200, refer again to FIG. 3 and consider the method used for changing the load point for the assemblies 14 moving out from the assembly closest to the center of the disk to the assembly closest to the outer edge of the disk.

As previously pointed out, the pressure on the head ssemblies due to the air bearing increases moving from he center of the disk out towards the outer edge. Howver, it should further be noted that the difference in presure across the bearing surface of the heads closest to the enter of the disk is greater than the difference in pressure cross the bearing surface of the heads near the outer dge of the disk.

As previously mentioned in regard to FIG. 3, the rivets 12 (see FIG. 8) are inserted into the apertures 22c and 2b. Therefore, the apertures 22c and 22b determine he exact position at which the assembly 100 is connected o the casting 22 with respect to the piston 308 of the orresponding head actuation assembly 300. The comensation for the difference in differential bearing presure is obtained by offsetting the apertures 22b and 22c lightly further to the right for each successive pair of ssemblies 14 moving in towards the center of the disk. n this manner, the load point formed by the pressure of the piston 308a is offset slightly in the direction of the greater bearing pressure load applied to the corresponding head assembly for each successive pair of assemblies 14 moving in towards the center of the disk. Since the casting is premachined with the apertures 22b and 22c formed, the possibility of placing assemblies at the wrong position is eliminated.

In the following claims, head assembly is meant to refer to a structure containing one or more reading heads and/or writing heads for use in reading and/or writing information on a recording surface.

What is claimed is:

1. In a storage apparatus including a plurality of disk surfaces rotating in a fluid atmosphere so as to form a fluid bearing adjacent thereto, each disc surface including a plurality of circular magnetic tracks positioned at different radial positions thereon, each of said tracks on each disk surface being arranged at the same radial position as a track on each of the other disk surfaces, at least one magnetic head for each of said tracks supported to allow actuation onto the fluid bearing adjacent the corresponding track, means for each of said heads comprising a fluid chamber including an input port and a plunger extending out of said chamber and actuated by fluid pressure in the chamber for applying a force to the corresponding head for moving same into a floating position on the associated fluid bearing, and an adjustable pressure regulating device for each different radial position of the heads for coupling a pressure source to the input port of each of the fluid chambers for the heads at corresponding radial position for controlling the pressure applied to such chambers and to the corresponding plunger for thereby allowing simultaneous control of spacing between head and magnetic surface of all said heads at the same radial position adjacent the disk surfaces.

2. In a storage apparatus including a plurality of disk surfaces rotating in a fluid atmosphere so as to form a fluid bearing adjacent thereto, each disk surface including a plurality of circular recording tracks at different radial positions thereon, each of said tracks on each disk surface being arranged at the same radial position as a track on each of the other disk surfaces, at least one read or write head for each of said tracks supported to allow actuation onto the fluid bearing adjacent the corresponding track, a controllable fluid actuated plunger means for each of said heads for applying a force thereto for moving same into a floating position on the fluid bearing, and an adjustable pressure regulating device for each different radial position of the heads for coupling a pressure source to each of the fluid actuated plunger means for the heads at the corresponding radius for controlling the pressure applied by the corresponding plunger means to the corresponding head and thereby allow simultaneous control of the spacing between head and disk surface of all of said heads at the same radial position adjacent the disk surfaces.

3. In a storage apparatus including a plurality of disk surfaces rotating in a fluid atmosphere so as to form a fluid bearing adjacent thereto, each disk surface including a plurality of circular magnetic tracks positioned at different radial positions thereon, each of said tracks on each disk surface being arranged at the same radial position as a track on each of the other disk surfaces; at least one magnetic head for each of said tracks supported to allow actuation into an operating position on the fluid bearing adjacent the corresponding track; means for each of said heads comprising a fluid chamber, including an input port, a plunger extending out of said chamber and a diaphragm in said chamber for actuating the corresponding plunger responsive to pressure in the corresponding chamber causing such plunger to force the corresponding head into a floating operating position on the fluid bearing; and an adjustable pressure regulating device for each different radial position of said heads for coupling a pressure source to the input port of each of the fluid chambers for the corresponding heads for controlling the pressure applied to such chambers and the corresponding plunger for thereby allowing simultaneous control of spacing between head and disk surfaces of all of said heads at the same radial position adjacent the disk surfaces.

4. In a storage apparatus including a plurality of disk surfaces rotating in a fluid atmosphere for forming a fluid bearing adjacent thereto, a plurality of read or write head assemblies for each disk surface, each at a different radius with respect to the corresponding disk surface, each head assembly on each disk surface having a corresponding head assembly at the same radius adjacent each of the other disk surfaces, said head assemblies having a surface constructed for floating on the fluid bearing, controllable fluid actuated means for each of said read or write heads for applying a force thereto for moving same into a floating position on the fluid bearing, and an adjustable regulating device for each different radial position of the head assemblies for coupling a source of fluid pressure to each of the fluid actuated means for the corresponding head assemblies at the same radius for separately controlling the force applied thereby to the corresponding head assemblies and thereby simultaneously control the head to surface spacing of all heads at the same radius separately from heads at a different radius.

5. Storage apparatus comprising, a plurality of closely spaced recording disks rotatable about a common axis, each having a recording surface positioned adjacent to and facing each adjacent disk; a plurality of read and write head assemblies for each recording surface having a back side and a bearing surface which is constructed for floating on an air bearing formed by said disks when rotating, said head assemblies being positioned at different radii adjacent the corresponding recording surfaces with each of said head assemblies having at least one other head at the same radius adjacent each of the other recording surfaces, a head assembly adjacent one recording surface being positioned back to back opposite to a head assembly at the same radial position for the adjacent disk; actuating means positioned in between each two back to back head assemblies comprising a chamber, a fluid actuated plunger for each of the corresponding two head assemblies which extend out of said chamber in opposite directions toward the back of the corresponding head assembly and a diaphragm for each plunger spaced apart from each other in said chamber for actuating the corresponding plunger in response to a fluid pressure applied in between said diaphragms forcing the plunger to move the corresponding head assemblies simultaneously into a floating position on a fluid bearing formed by the corresponding disk; means for coupling fluid pressure to the storage apparatus; and separate regulator means for each group of head assemblies at the same radius for coupling said coupling means to all of said chambers associated with the corresponding head assemblies at the radius corresponding to such regulator thereby allowing pressure to all head assemblies at the same radius to be controlled simultaneously and independent from the head assemblies at different radii.

6. Storage apparatus as defined in claim 5 comprising a mounting member for each pair of facing disk surfaces, each of said mounting members having mounted thereon each of said actuating means for the corresponding pair of disk surfaces, said mounting members being pivotally mounted so that it can be rotated in and out in between the corresponding disk surfaces.

7. Storage apparatus as defined in claim 5 comprising resilient mounting means for each of said heads, each of said resilient mounting means being connected to the corresponding head assembly and to the associated mounting member to permit the corresponding head assembly to pivot about as it is moved into a floating position.

8. Storage apparatus comprising, a plurality of closely spaced recording disks rotatable about a common axis each having a recording surface positioned adjacent to and facing each adjacent disk; a plurality of read and write head assemblies for each recording surface having a back side and a bearing surface which is constructed for floating on an air bearing formed by said disks when rotating, said head assemblies being positioned adjacent the corresponding recording surfaces and including at least two head assemblies positioned back to back opposite to each other at the same radial position adjacent two facing disk surfaces; actuating means positioned in between said two back to back head assemblies comprising a chamber, a fluid actuated plunger for each of the corresponding two head assemblies which extend out of said chamber in opposite directions toward the backs of the corresponding head assemblies and a diaphragm for each plunger spaced apart from each other in said chamber for actuating the corresponding plungers in response to a fluid pressure applied in between said diaphragms forcing the plungers to move the corresponding head assemblies simultaneously into a floating position on a fluid bearing formed by the corresponding disk surface; and means for coupling a source of pressure to said chamber for causing the corresponding head assemblies to be simultaneously actuated into a floating position on fluid bearings formed by the corresponding disk surfaces.

9. Storage apparatus comprising, a plurality of closely spaced recording disks rotatable about a common axis each having a recording surface positioned adjacent to and facing each adjacent disk; a plurality of read and write head assemblies for each recording surface having a back side and a bearing surface which is constructed for floating on an air bearing formed by said disks when rotating, said head assemblies being positioned at different radii adjacent the corresponding recording surfaces with each of said head assemblies having at least one head at the same radius adjacent each of the other recording surfaces; a head assembly adjacent one recording surface being positioned back to back opposite to a head assembly at the source radial position for the adjacent disk; a member pivotally mounted so that it can be rotated in between and out from in between adjacent disks; actuating means on said pivotally mounted member positioned in between each two back to back head assemblies comprising a chamber, a fluid actuated plunger for each of the corresponding two heads which extend out of said chambers in opposite directions toward the back of the corresponding head assembly and a diaphragm for each plunger spaced apart from each other and positioned in said chamber for actuating the corresponding plunger in response to a fluid pressure applied in between said diaphragms forcing the plunger to move the corresponding head assemblies simultaneously into a floating position on a fluid bearing formed by the corresponding disk; and separate regulator means for each group of head assemblies at the same radius for coupling a source of pressure to all of said chambers associated with the corresponding head assemblies at the radius corresponding to such regulator thereby allowing pressure to all head assemblies at the same radius to be controlled simultaneously and independent from the heads at different radii.

References Cited by the Examiner

UNITED STATES PATENTS

| | | | |
|---|---|---|---|
| 3,051,954 | 8/1962 | Osterlund | 179—100.2 |
| 3,229,268 | 1/1966 | Slyst | 340—174.1 |

BERNARD KONICK, *Primary Examiner.*

A. BERNARD, V. P. CANNEY, *Assistant Examiners.*